United States Patent

Perotto et al.

[11] Patent Number: 5,955,699
[45] Date of Patent: Sep. 21, 1999

[54] PYROTECHNIC GAS MICROGENERATOR HAVING A SEALED TWO-WIRE CONNECTOR

[75] Inventors: Christian Perotto, Ballancourt; Daniel Duvacquier, Bordeaux, both of France

[73] Assignee: S.N.C. Livbag, Vert le Petit, France

[21] Appl. No.: 08/921,514

[22] Filed: Sep. 2, 1997

[30] Foreign Application Priority Data

Oct. 1, 1996 [FR] France ................................... 96 11924

[51] Int. Cl.$^6$ ............................... C06D 5/00; F42B 3/18; B60R 21/26
[52] U.S. Cl. .................. 102/530; 102/202.5; 102/202.9; 86/1.1; 280/741; 422/166; 439/296; 439/395
[58] Field of Search ............................. 102/202.2, 202.5, 102/202.7, 202.9, 202.12, 202.14, 293, 530, 531; 86/1.1; 280/741; 422/165, 166; 439/296, 395, 397

[56] References Cited

U.S. PATENT DOCUMENTS

| | | | |
|---|---|---|---|
| 3,930,708 | 1/1976 | Wedekund et al. | 439/397 |
| 3,964,816 | 6/1976 | Narozyny | 439/397 |
| 3,991,649 | 11/1976 | Patrichi | 89/1 B |
| 4,271,453 | 6/1981 | Yajima et al. | 102/202.2 |
| 4,422,381 | 12/1983 | Barrett | 102/202.2 |
| 4,734,265 | 3/1988 | Nilsson et al. | 422/166 |
| 5,056,815 | 10/1991 | Geisreiter | 250/741 |
| 5,088,412 | 2/1992 | Patrichi | 102/202.5 |
| 5,142,982 | 9/1992 | Diepold et al. | 102/202.14 |
| 5,345,872 | 9/1994 | Takahashi et al. | 102/202.2 |
| 5,433,147 | 7/1995 | Brede et al. | 102/202.2 |
| 5,542,701 | 8/1996 | Rion | 280/735 |
| 5,813,694 | 9/1998 | Jeong | 280/741 |

FOREIGN PATENT DOCUMENTS

| | | | |
|---|---|---|---|
| 0 002 367 | 6/1979 | European Pat. Off. . | |
| 0 045 154 | 2/1982 | European Pat. Off. . | |
| 0 474 113 | 9/1995 | European Pat. Off. . | |
| 2 730 965 | 8/1996 | France . | |
| 27 45 658 | 4/1979 | Germany . | |
| 2229588 | 9/1990 | United Kingdom | 439/395 |
| WO 94/01307 | 1/1994 | WIPO . | |

Primary Examiner—Harold J. Tudor
Attorney, Agent, or Firm—Pillsbury Madison & Sutro, LLP

[57] ABSTRACT

The invention relates to a gas microgenerator intended more particularly for automobile safety. The microgenerator (1) comprises an igniter support (2) provided with a central bore (3) extended by a cylindrical neck (4) in which an igniter body (5) is fixed by crimping, two electrodes (8, 9) passing through this igniter body. A resistor (10) embedded in an ignition composition (11) links the two electrodes together. A shatterable case (13) containing an ignition powder (14) surrounds the resistor and the ignition composition. The electrodes in their lower part include cutting slots into which are inserted two electrically conducting sheathed wires (20, 21) coming from a supply cable (19). A closure piece (24), which is snap-fitted into the central bore locks the microgenerator. The microgenerator can be used to operate a belt retractor or to ignite a generator intended to inflate an airbag.

11 Claims, 3 Drawing Sheets

PYROTECHNIC GAS MICROGENERATOR HAVING A SEALED TWO-WIRE CONNECTOR

The invention relates to a pyrotechnic gas microgenerator having a sealed two-wire connector allowing easy assembly of these generators, which can be used in particular in the field of automobile safety.

The inflation of airbags or the tensioning of seat belts in the event of motor-vehicle accidents requires, given the very short response times required of safety devices, the use of pyrotechnic gas generators.

These pyrotechnic gas generators essentially comprise a pyrotechnic gas-generating composition ignited, in the event of an accident, by an initiator which converts the electrical signal delivered by a collision detector into a combustion phenomenon.

The initiator or microgenerator therefore includes two electrodes, generally cylindrical, which are located on the end of the generator and which will be plugged into a connector linked by conducting wires to the collision detector delivering the electrical pulse.

Generators equipped with such initiators, which are for example described in French Patent Application 2,730,965, have the drawback of possibly developing poor electrical contacts over time, in particular as a result of the vibrations to which they are subjected.

For safety reasons, constructors are increasingly demanding that the generator be equipped with an initiator with wires, also called a two-wire microgenerator or initiator, so that the generator is directly plugged into the collision detection module, thus guaranteeing that good electrical contacts are maintained over time.

To do this, it is necessary for the electrodes of the initiator to be fixed, by soldering, or by bonding, to the electrically conducting wires, as described for example in the patents U.S. Pat. No. 5,345,872 and U.S. Pat. No. 5,433,147. However, this apparently simple solution poses new problems to those skilled in the art in the case of mass production on an industrial scale of generators equipped with such initiators.

In an industrial process, the pyrotechnic gas generators are assembled continuously on assembly lines, generally starting from the initiator.

If the wires are fixed to the electrodes of the initiator at the start of the assembly line, it is necessary to transport, over the entire length of the line, generators extended by wires which may be more than one meter in length, which is not practical.

If the wires are fixed to the electrodes of the initiator at the end of the assembly line, or subsequently at the equipment manufacturer's or at the motor-vehicle constructors's, this fixing will, using the currently known means, be external to the initiator and therefore to the generator and will not provide the desired safety guarantees. Moreover, those skilled in the art do not like soldering to a pyrotechnic generator containing active pyrotechnic substances.

Finally, the operations of fixing the wires, whether they be carried out at the start or at the end of the assembly line, often reduce the rate of production of the generators.

Those skilled in the art are therefore confronted with the problem of how to fix the conducting wires to the electrodes of a pyrotechnic initiator in a simple and irreversible manner and so that the fixing is internal to the igniter or to the gas generator.

An initiator having a self-sealing two-wire connector, in which the electrodes are extended, at the outlet, by cutting pincers which can deform under the action of an axial force, has recently been proposed in U.S patent application Ser. No. 08/838,043, filed on Apr. 22, 1997. Such pincers are, for example, described in British Patent EP (UK) -B-0,474,113. A snap-fit closure piece carrying the conducting wires enables the latter to be irreversibly fixed at the end of the production line.

This technically very satisfactory solution is, however, limited to initiators for which the conducting wires enter in a direction parallel to the axis of the initiator. Those skilled in the art do not have available a simple and reliable solution to the problem posed in the case of initiators or generators in which it is desired for the conducting wires to enter in a direction perpendicular to the axis of revolution of the initiator or generator.

The object of the invention is specifically to provide those skilled in the art with such a solution.

The invention therefore relates to a pyrotechnic gas microgenerator which includes:

i) an igniter support in the form of an axisymmetric piece which includes a central bore extended by a hollow cylindrical neck, the axis of which coincides with the axis of the igniter support;

ii) an igniter body in the form of an axisymmetric piece which goes into the said hollow neck and into the upper part of the said central bore which lies near the said neck, the igniter body being fastened to the said support and containing two longitudinal electrodes which pass right through it, the upper ends of the said electrodes being linked together by a pyrotechnic ignition assembly, while the lower ends of the said electrodes lie inside the central bore and are connected to a cable which includes two electrically conducting sheathed wires;

iii) a shatterable case which bears on the igniter support, surrounding the said neck as well as the said ignition assembly, and which contains an ignition powder;

characterized in that:

iv) the said igniter support includes a radial opening enabling the conducting sheathed wires to be inserted and in that the said central bore has an internal cutaway;

v) the lower ends of the electrodes each include at least one slot parallel to the axis of the igniter body, this slot having cutting edges and one of the conducting wires being inserted into it;

vi) a piece for holding the electrodes in place, which has an external lateral rim and is snap-fitted into the internal cut-away of the said central bore.

Preferably, the radial opening emerges on the end face of the igniter support which is opposite the said hollow neck. In this configuration, the radial opening thus forms a groove enabling the electrical cable to be inserted longitudinally.

According to an alternative embodiment, the radial opening corresponds only to a perforation which requires radial insertion of the electrical cable.

According to another, preferred embodiment, the internal cut-away consists of two radial slots, the external lateral rim of the piece for holding the electrodes in place consisting of two shouldered lugs which are snap-fitted into these slots. The internal cut-away may also consist of a shoulder of the central bore, the external lateral rim of the piece for holding the electrodes in place extending more or less all around the periphery of this piece.

According to a first preferred embodiment of the invention, the igniter support has, on its external side wall, an entry bushing serving to receive and immobilize the electrically conducting cable. This entry bushing will advantageously have the structure of a deformable gutter which is only partly fastened to the igniter support and which includes a deformable region in order to allow the cable firstly to be positioned and secondly to be immobilized after the deformable region has been crimped around the cable. The conducting cable comprises two electrically conducting wires, each consisting of an electrically conducting metal core surrounded by an insulating sheath.

According to a second preferred embodiment of the invention, the lower end of each electrode includes two cutting slots aligned one behind the other in a plane of symmetry of the electrode.

According to a third preferred embodiment of the invention, the pyrotechnic ignition assembly linking the upper ends of the electrodes comprises at least one heating resistor and a pyrotechnic ignition composition.

According to a fourth preferred embodiment of the invention, the igniter body is fastened to the igniter support by crimping of the former in the hollow cylindrical neck of the latter. Advantageously too, the shatterable case is fixed to the igniter support, also by crimping.

According to a fifth preferred embodiment of the invention, the igniter body contains a ferrite core.

The invention also relates to a method of assembling the microgenerators forming the subject of the invention, in which, after having assembled together the igniter support, the igniter body, including the electrodes and the ignition assembly, and the shatterable case containing the ignition powder, the conducting cable is placed in the entry bush perpendicular to the axis of the igniter support so that each electrically conducting sheathed wire engaged in the radial groove of the igniter support passes above the slots presented by one of the electrodes, the conducting wires are then inserted into the said slots, the edges of which cut their insulating sheath and become embedded in the metal core. The entry bush is then clamped around the conducting cable in order to immobilize it, finally, the piece for holding the electrodes in place is fitted.

The invention thus enables those skilled in the art to have available a two-wire gas microgenerator of very simple construction which has a radial opening enabling the electrically conducting cable to be positioned perpendicular to the axis of the microgenerator. This microgenerator may be assembled on an assembly line without the conducting cable, which may be fitted only at the end of assembly. Moreover, after the snap-fitting piece for holding the electrodes in place has been fitted into the central bore of the igniter support, the microgenerator can be opened and removed without breaking the igniter support only with very great difficulty, this being of very great advantage from the safety standpoint.

A microgenerator according to the invention can be used directly as a gas generator in a belt retractor. It can also be used as an ignition device in a more complex generator serving to inflate an airbag for protecting an occupant of a motor vehicle. In the latter case, the invention provides the advantage of allowing the construction of two-wire pyrotechnic generators for airbags having radial inlet of the conducting cable, which can be fitted only at the end of the assembly line, after the generator has been completely assembled around its ignition microgenerator.

A preferred embodiment of the invention will now be described with reference to FIGS. 1 to 3.

Figure 1:
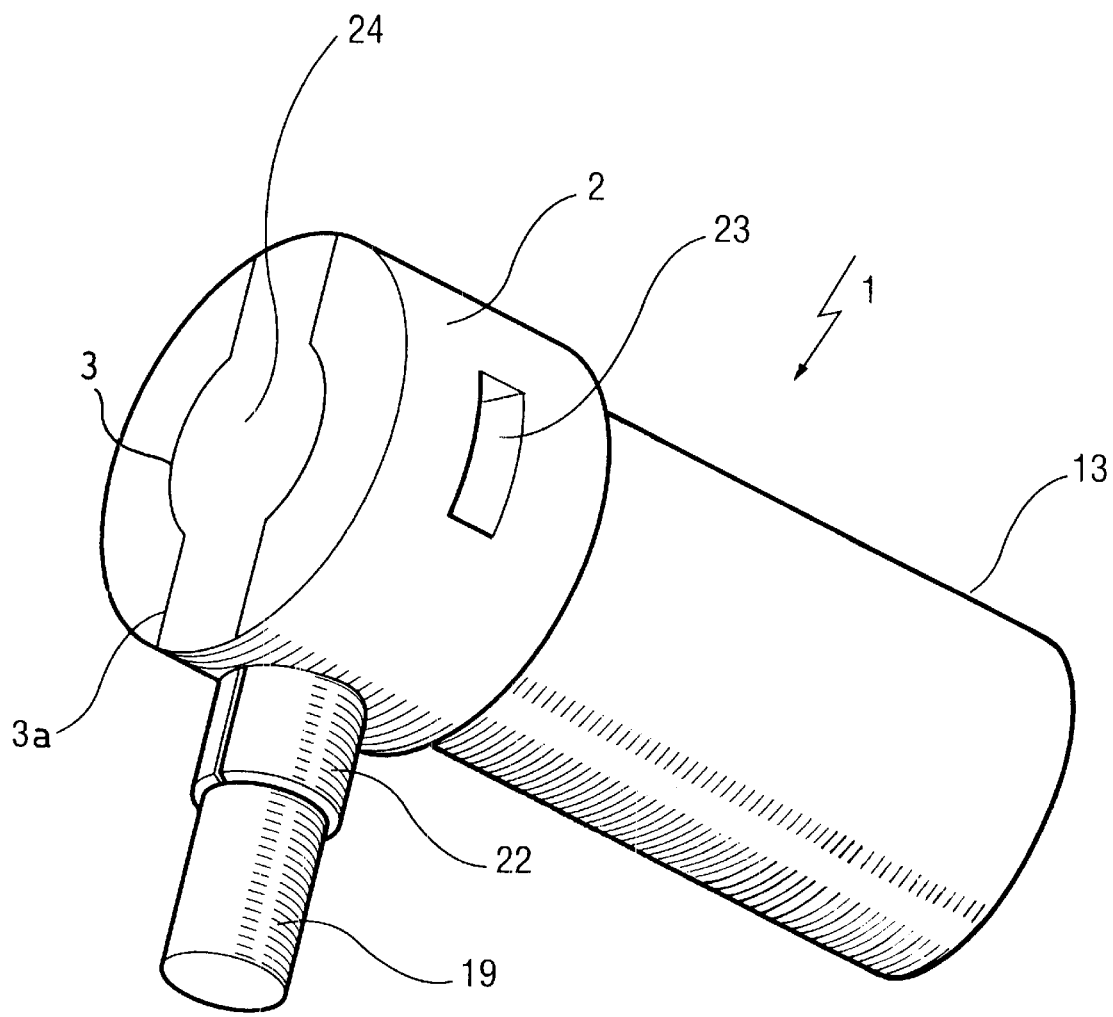
FIG. 1 shows, seen in perspective, a microgenerator according to the invention.
Figure 2:
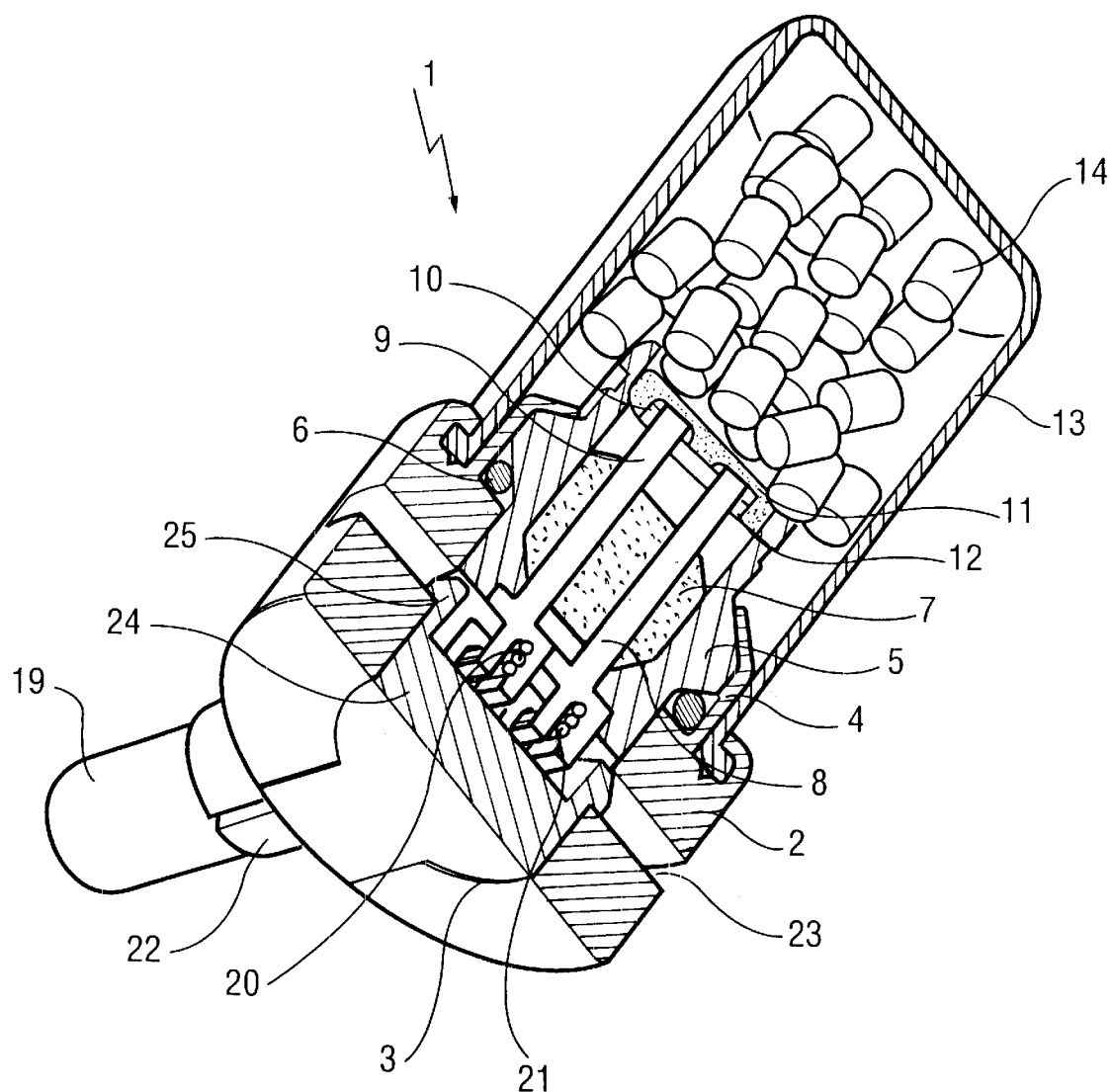
FIG. 2 is a perspective view of the microgenerator shown in FIG. 1, opened in a central axial plane.

A microgenerator 1 according to the invention has been shown in FIGS. 1 and 2.

This microgenerator comprises a cylindrical igniter support 2 which includes a central bore 3 emerging on the end surface of the support 2 and extended by a hollow cylindrical neck 4, the axis of which coincides with the axis of the support 2. The igniter support 2 is advantageously made of a strong alloy such as "zamak".

An igniter body 5 in the form of an axisymmetric piece, having an enlarged central part, goes into the hollow neck 4 and into the upper part of the central bore 3. This igniter body 5 rests on an O-ring seal 6 placed on the bottom of the neck 4 and is fastened to the igniter support 2 by crimping of the free end of the neck 4 onto the enlarged central part of the igniter body 5. Advantageously, as shown in FIG. 2, the igniter body 5 contains a ferrite core 7.

Two axial electrodes 8 and 9 pass through the igniter body 5 over its entire height. The upper ends of the electrodes 8 and 9 emerge in the upper part of the body 5 and are linked together by a pyrotechnic ignition assembly comprising a heating resistor 10 and a pyrotechnic ignition composition 11. A refractory washer 12 insulates the ignition assembly from the rest of the igniter body 5.

The lower ends of the electrodes 8 and 9 emerge in the lower part of the central bore 3 and are described in detail a little later.

A cylindrical case 13, made of thin shatterable metal such as aluminium, is fixed by crimping onto the upper periphery of the igniter support 5 so as to surround the neck 4 as well as the ignition assembly. This case contains particles of ignition powder 14 which will advantageously be either a nitrocellulose powder or a composite powder.

Figure 3:
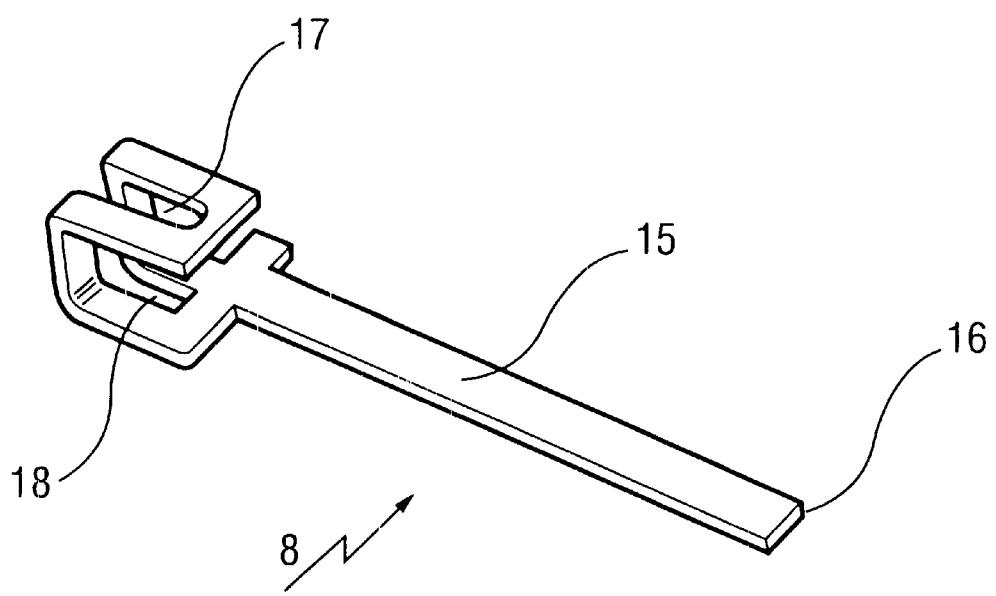
FIG. 3 shows, seen in perspective, an electrode used for the production of the microgenerator shown in FIGS. 1 and 2.

FIG. 3 shows an electrode 8 which can be used in the context of the invention. This electrode 8 is composed of a conducting rod 15, the free end 16 of which corresponds to the upper end connected to the ignition assembly. The opposite end, or lower end, is profiled so as to have two slots 17 and 18 lying in a plane of symmetry of the electrode. These slots 17 and 18, which have cutting edges, are, after the electrode has been fitted into the igniter body 5, parallel to the axis of the latter. Such electrodes are, for example, described in European Patent Applications EP-A-0,002,367 and EP-A-0,045,154.

Referring again to FIGS. 1 and 2, it may be seen that the lower ends of the electrodes 8 and 9 are connected to a cable 19 which includes two electrically conducting sheathed wires 20 and 21, each wire going into the slots of the lower end of one of the electrodes 8 or 9. The slots 17 and 18 of each electrode have a slightly smaller width than the diameter of the conducting metal core of the sheathed wire. Upon inserting the wire into the slots, the insulating sheath is cut and pushed back by the cutting edges which penetrate the conducting metal core, thus making a good contact. It should be pointed out that, by virtue of the use of the electrodes which have just been described, the sheathed wires contained in the cable 19 do not have to be stripped before they are fitted into the microgenerator. Moreover, given the orientation of the slots, the cable 19 is placed perpendicular to the axis of the microgenerator.

In order to make it easier to receive and fix the cable 19, the igniter support 2 has, on its external end wall, perpendicular to the bore 3, an entry bushing 22. This entry bushing has an initial radial profile in the form of a U and is fastened to the igniter support only in its rounded part, the two branches of the U being deformable so that, after bending them, this entry bushing clamps around the cable 19.

The central bore 3 has two slots 23 enabling a piece 24 for holding the electrodes in place to be fitted, this piece having two external lateral lugs 25 which are snap-fitted into these slots 23. Moreover, the piece 24 for holding the electrodes in place contributes to the quality of the electrical connection by holding the conducting wires 20 and 21 in place at the bottom of the slots presented by the electrodes 8 and 9, by exerting pressure on the ends of these wires which extend beyond the said slots.

It is thus possible to form the microgenerator 1 by assembling, firstly, the igniter support 2, the igniter body 5, including the electrodes 8 and 9 and the ignition assembly 10 and 11, the shatterable case 13 and the ignition powder 14. The cable 19 is then put into the entry bushing 22 perpendicular to the axis of the igniter body 5 so that each sheathed conducting wire 20 and 21 passes above the slots 17 and 18 presented by each electrode 8 or 9. The sheathed wires 20 and 21 are then inserted into the said slots and the entry bushing 22 is clamped around the cable 19. Finally, the piece 24 for holding the electrodes in place is fitted.

In the event of an accident, a collision or sudden deceleration detector will send an electrical signal through the wires 20 and 21. This signal will pass via the electrodes 8 and 9, heating the resistor 10 and igniting the composition 11 which will itself ignite the grains of powder 14. The combustion gases from the latter will cause the case 13 to explode and will be able to be used either for actuating directly a belt retractor or for igniting a pyrotechnic gas-generator charge intended to inflate an airbag for the protection of an occupant of a motor vehicle.

We claim:

1. Pyrotechnic gas microgenerator (1) which includes:
   i) an igniter support (2) in the form of an axisymmetric piece which includes a central bore (3) extended by a hollow cylindrical neck (4), the axis of which coincides with the axis of the support;
   ii) an igniter body (5) in the form of an axisymmetric piece which goes into the said hollow neck (4) and into an upper part of the said central bore (3) which lies near said neck, the igniter body being fastened to the said support and containing two longitudinal electrodes (8, 9) which pass right through it, the upper ends of the said electrodes being linked together by a pyrotechnic ignition assembly (10, 11), while the lower ends of the said electrodes lie inside the central bore (3) and are connected to a cable (19) which includes two electrically conducting sheathed wires (20, 21);
   iii) a shatterable case (13) which bears on the igniter support (2), surrounding the said neck (4) as well as the said ignition assembly, and which contains an ignition powder (14);
characterized in that:
   iv) the igniter support (2) includes a radial opening (3a) enabling the conducting sheathed wires to be inserted and in that the said central bore (3) has an internal cut-away (23);
   v) the lower ends of the electrodes (8, 9) each include at least one slot (17) parallel to the axis of the igniter body, this slot having cutting edges and one of the conducting wires being inserted into it;
   vi) a piece (24) for holding the electrodes in place, which has an external lateral rim (25) and is snap-fitted into the internal cut-away (23) of the said central bore.

2. Microgenerator according to claim 1, characterized in that the radial opening (3a) emerges on an end face of the igniter support (2).

3. Microgenerator according to claim 1, characterized in that the internal cut-away (23) consists of two radial slots, the external lateral rim of the holding piece (24) consisting of two shouldered lugs (25) which are snap-fitted into these two radial slots.

4. Microgenerator according to claim 1, characterized in that the igniter support (2) has on its external side wall, an entry bushing (22) serving to receive and immobilize the cable (19).

5. Microgenerator according to claim 4, characterized in that the entry bushing (22) is only partly fastened to the igniter support (2) and includes at least one deformable region.

6. Microgenerator according to claim 4, characterized in that the lower end of each electrode includes two slots (17, 18) lying in a plane of symmetry of the electrode.

7. Microgenerator according to claim 6, characterized in that the pyrotechnic ignition assembly linking the upper ends of the electrodes (8, 9) comprises at least one resistor (10) and a pyrotechnic ignition composition (11).

8. Microgenerator according to claim 7, characterized in that the igniter body (5) is fastened to the igniter support (2) by crimping in the neck (4).

9. Microgenerator according to claim 8, characterized in that the shatterable case (13) is fixed by crimping to the igniter support (5).

10. Microgenerator according to claim 9, characterized in that the igniter body contains a ferrite core (7).

11. Method of assembling a microgenerator according to any one of claims 1 to 10, characterized in that:
   after having assembled together the igniter support (2), the igniter body (5), including the electrodes (8, 9) and the ignition assembly (10, 11), the shatterable case (13) and the ignition powder (14), the conducting cable (19) is placed in an entry bushing (22) perpendicular to the axis of the igniter body so that each electrically conducting sheathed wire engaged in the radial opening (3a) of the igniter support (2) passes above the slot presented by one of the electrodes, the conducting wires are then inserted into the said slot, the entry bushing (22) is clamped around the cable (19) and, finally, the piece for holding the electrodes in place (24) is fitted.

* * * * *